United States Patent Office 2,944,844
Patented July 12, 1960

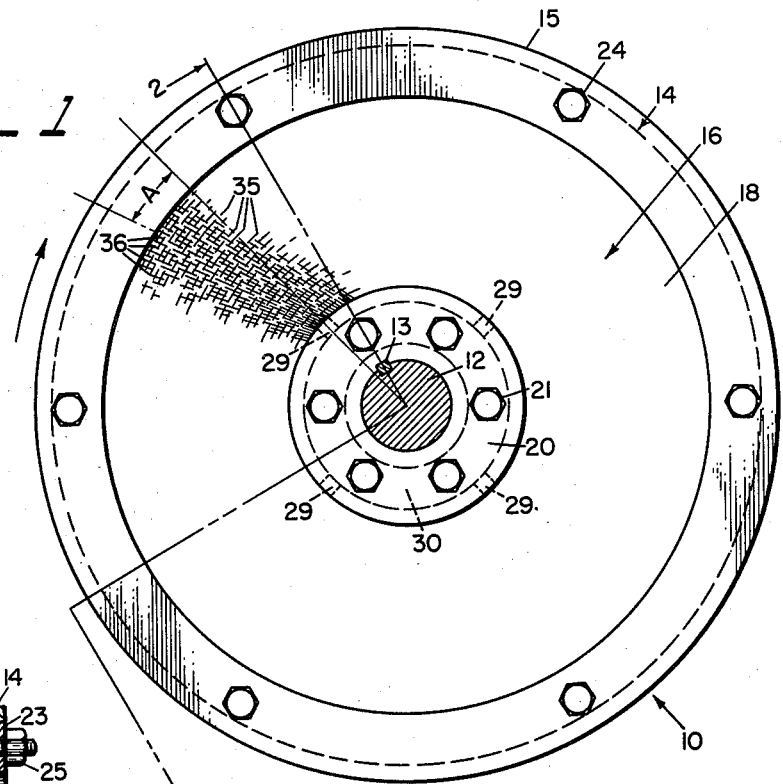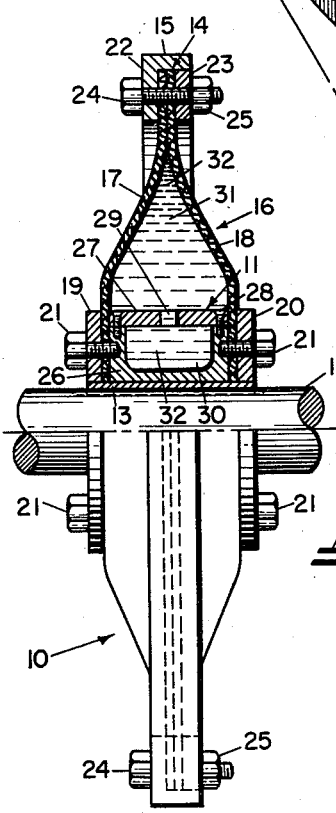

2,944,844
RESILIENT COUPLING

Carl David Miller, Columbus, Ohio, assignor, by mesne assignments, to The Cooper Bessemer Corporation, Mount Vernon, Ohio, a corporation of Ohio Filed Nov. 1, 1954, Ser. No. 466,116

6 Claims. (Cl. 287—53)

This invention relates to a resilient coupling. It comprises a novel elastic connection between a driving member and a driven member to absorb fluctuations in torque and slight misalignment between the members.

Briefly, this resilient coupling comprises: a hub member which may be attached to a shaft; a wheel member which may be attached to another shaft or engaged by a belt or other driving means; a hollow, flexible disk connected between the wheel member and the hub member; and a fluid in the hollow flexible disk.

Today, as in the past, resilient couplings are constructed which make use of cloth and/or resilient materials connected between a driving member and a driven member. These couplings make use of the natural elasticity of the materials themselves. In these conventional cloth disk resilient couplings, the primary purpose of the cloth is to compensate for misalignment of the driving and driven members. Since the cloth is relatively nonelastic, a resilient coupling employing cloth is not an energy storage type of coupling. On the other hand, conventional resilient couplings having resilient materials disposed between the driving and driven members are capable of energy storage, but are limited to installations in which torque loads are relatively light. Without provision for damping the possibility of resonance of the coupling as a vibrating system at certain frequencies of fluctuation of load, is a decided disadvantage. These simple prior devices are thus unsuitable for use on drives where torque fluctuations are of considerable magnitude.

Some resilient couplings of this class have been altered in the past by additional mechanisms and refinements to compensate in some measure for these disadvantages. However, introduction of these refinements has the further disadvantage that they usually comprise machine parts which are precision built and, therefore, expensive to manufacture. Further, these devices normally have a metallic compression spring which is subject to fatigue and early failure.

Accordingly, it is an object of this invention to provide a resilient coupling wherein rotation is produced in the driven member by tension in the strands of a reinforced fabric hollow disk containing a fluid. It is another object to provide a resilient coupling in which sliding and moving parts are eliminated, and replaced with a flexible elastic fluid-controlled disk of lesser cost and long life. It is still another object to provide a resilient coupling in which a fluid is provided to dampen the rebound vibrations of the elastic disk after subjection to a fluctuating torque.

It is another purpose of this invention to provide a hollow flexible disk coupling containing a fluid under pressure, wherein the disk contains a fabric that is woven in such a manner that the strands under the action of the fluid pressure, act as a torsion spring to store the energy of maximum force fluctuations of the torque cycle.

It is yet another purpose to provide a hollow flexible disk coupling wherein the disk comprises a resilient material reinforced with a fabric having wooflike strands disposed at an angle to radial lines of the coupling so that deflection of the sides of the disk causes relative rotation between the hub and the rim of the coupling.

To these and other ends, this invention comprises apparatus which is disclosed in a preferred form in the following description and attached drawings:

In the drawings:

Fig. 1 is an elevation view, partially detailed, of one embodiment of this invention; and Fig. 2 is a partially sectioned elevation view taken along the line 2—2 of Fig. 1.

Referring to Figs. 1 and 2, a resilient coupling, designated generally as 10, comprises: a hub member, designated generally as 11, fixed against rotation on a shaft 12, by a key 13; a wheel member, designated generally as 14, adapted to drive or be driven by a belt or other means not shown; and a hollow flexible disk, designated generally as 16.

The disk 16 comprises two side members 17 and 18, independently fastened to opposite ends of the hub member 11 by clamping beneath retainer rings 19 and 20, respectively, by bolts 21. At its peripheral extremity, the sides 17 and 18 of the disk 16 are joined in a compression seal between an outer rim member 22 and an inner ring member 23 of the wheel member 14 by bolts 24 and nuts 25.

The hub member 11 comprises an annular base member 26 having a substantially U-shaped cross section and an annular outer cover member 27, fastened together with screws 28. The cover member 27 is provided with one or preferably a plurality of communication passages 29, four being shown in Fig. 1.

It will be seen that the annular base member 26 and the cover member 27 combine to form an annular reservoir 30 in hub member 11. The sides 17 and 18 of the disk 16 combine with the cover 27 to form an annular chamber 31. A liquid 32 is provided in the chamber 31 and the reservoir 30. The passage 29 provides a means of fluid communication between the chamber 31 and the reservoir 30. The size of the passages 29 provides a means of orifice control over fluid flow between the chamber 31 and the reservoir 30.

Each of sides 17 and 18 comprise formed sheetlike portions of a resilient material, such as rubber, reinforced with a woven fabric, preferably enmeshed together. Depending on the amount of torque which the coupling is to carry, the fabric may be of either a cloth or wire material. If the coupling is to be lightly loaded, the material may be cloth. If the coupling is to be heavily loaded, the fabric may be composed of wire strands.

The reinforcement fabric of this invention comprises two groups of strands. The first group or warplike strands 35 are disposed either as concentric circular strands, or are disposed as spiral strands commencing under the retainer ring members 19 and 20 and continuing by progressive radial enlargement to the peripheral sealed portion of the disks 17 and 18 which is located under the outer rim and inner ring members 22 and 23, as shown in Fig. 1. A second group of wooflike strands 36 is interwoven with the first group of strands 35. Alternatively, the second group of wooflike strands need not be interwoven with the first group of strands but may be bonded in the resilient material in a position adjacent to the warplike strands 35. The wooflike strands 36 are disposed askew, at an angle designated A in Fig. 1, to radial projected lines of the coupling. They are also askew to the longitudinal axis of the strands in the first group 35.

The operation of a resilient coupling of this invention is as follows:

The chambers 30 and 31 are partially filled with a liquid 32. That portion of the chambers 30 and 31 not occupied by the liquid 32 is filled with a gas, preferably air. The hydrostatic pressure within the chambers 30 and 31 is maintained at a value to keep the sides 17 and 18 of the disk 16 taut and under tension. When the coupling is in operation and rotating, the action of centrifugal force causes the liquid 32 to occupy the chamber 31 and outer portion of the chamber 30, leaving the air to occupy the inner portion of the chamber 30, as shown in Fig. 2.

While either the wheel member 14 or the hub member 11 may be the driving member and the opposite be the driven member, for purposes of illustration it will be assumed that the hub member 11 is the driving member in a clockwise direction as viewed in Fig. 1, according to the arrow.

During rotation of the coupling under these conditions, an increase in torque applied by the hub 11 causes the rim 14 to be angularly retarded relative to the hub 11. As a consequence of this retardation, the wooflike strands 36 are drawn straighter and the amount of "bow" in sides 17 and 18 is decreased. Thus, the volume of the chamber 31 is decreased. This increases the pressure in the chambers 31 and 30 through the compression of the air in the chamber 30. The increased torque energy is resiliently converted to stored pressure energy in the liquid 32 and air in the chambers 30 and 31.

Upon a decrease in torque applied by the hub 11, the stored energy is reapplied at the rim 14 by reversal of the above-described operation. The pressure in the chamber 30 and 31 forces the sides 17 and 18 to become more "bowed." This decreases the distance between the points of attachment at the hub 11 and rim 14 of the wooflike strands 36 and causes the rim 14 to advance angularly relative to the hub 11. During operation under fluctuating torque conditions, the liquid 32 is "pumped" in and out through passage 29 between chambers 30 and 31 by changing internal pressure conditions. The size of the passage 29 provides a means of orifice control over the rate of flow between the chambers 30 and 31. This may be controlled to provide a dampening effect and prevent recurring rebound vibrations.

While it is preferred that a large portion of the internal volume of the chambers 30 and 31 be filled with liquid, as described above, the coupling may be operated without a liquid. In such a case the chambers 30 and 31 may be completely filled with a gas, such as air, under pressure.

It will be understood, of course, that, while the forms of the invention herein shown and described constitute preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts, may be substituted without departing from the spirit or scope of the invention herein disclosed.

What is claimed is:

1. A resilient coupling comprising: a driving member and a driven member; a hollow flexible disk connected between said members; a reservoir for fluid in one of said members; a fluid in the hollow of said flexible disk and said reservoir; fluid passage means between said reservoir and the hollow of said flexible disk to communicate and to control the rate of flow of fluid between said hollow flexible disk and said reservoir; said flexible hollow disk having walls of an elastic material, enmeshed with one group of flexible, relatively inelastic strands disposed in a spiral from an attachment position on said driving member to an attached position on said driven member, and with a second group of strands disposed at an angle to radial projected lines of said coupling from an attachment position on said driving member to an attachment position on said driven member.

2. A resilient coupling according to claim 1 wherein the hollow of said disk and said reservoir is filled partially with a liquid and partially with a gas, under pressure, whereby torque energy is stored as pressure energy by compression of the gas.

3. A resilient coupling comprising: a driving member and a driven member; a hollow flexible disk connected between said members; a reservoir for fluid in one of said members; a fluid in the hollow of said flexible disk and said reservoir; fluid passage means between said reservoir and the hollow of said flexible disk to communicate and to control the rate of flow of fluid between said hollow flexible disk and said reservoir; said flexible hollow disk having walls of an elastic material, enmeshed with one group of flexible, relatively inelastic strands disposed in concentric circles about the rotational axis of said coupling, from an attachment position on said driving member to an attachment position on said driven member, and a second group of strands disposed at an angle to radial projected lines of said coupling from an attachment position on said driving member to an attachment position on said driven member.

4. A resilient coupling according to claim 3 wherein the hollow of said disk and said reservoir is filled partially with a liquid and partially with a gas, under pressure, whereby torque energy is stored as pressure energy by compression of the gas.

5. A resilient coupling having a driving member and a driven member comprising: a hub member; a wheel member; a hollow flexible disk connected between said hub member and said wheel member; a reservoir for fluid in said hub member; a fluid in said hollow flexible disk and said reservoir; at least one fluid passage between said reservoir and the hollow of said flexible disk to control the rate of flow of said fluid between said hollow flexible disk and said reservoir; said hollow flexible disk having walls of an elastic material, enmeshed with one group of flexible, relatively inelastic warplike strands disposed in a spiral from an attachment position at said hub member to an attachment position on said wheel member and a second group of wooflike strands disposed at an angle in one direction only to radial projected lines of said hub member, from an attachment position on said driving member to an attachment position on said driven member; said strand disposition allowing changes in the volume of the hollow of said disk corresponding responsively to angular displacements between said hub member and said wheel member and to the pressure of said fluid induced by said volume changes.

6. A resilient coupling having a driving member and a driven member comprising: a hub member; a wheel member; a hollow flexible disk connected between said hub member and said wheel member; a reservoir for fluid in said hub member; a fluid in said hollow flexible disk and said reservoir; at least one fluid passage between said reservoir and the hollow of said flexible disk to communicate and to control the rate of flow of fluid between said hollow flexible disk and said reservoir; said hollow flexible disk having walls of a flexible elastic material, enmeshed with one group of warplike flexible, relatively inelastic strands disposed in concentric circles about the rotational axis of said coupling from an attachment position on said hub member to an attachment position on said wheel member, and a second group of wooflike strands disposed at an angle in one direction only to radial projected lines of said hub member; said strand disposition allowing changes in the volume of the hollow of said disk corresponding responsively to angular displacements between said hub member and said wheel member and to the pressure in said fluid induced by said volume changes.

(References on following page)

References Cited in the file of this patent

UNITED STATES PATENTS

| | | |
|---|---|---|
| 1,664,052 | Ungar | Mar. 27, 1928 |
| 2,244,941 | Degnon | June 10, 1941 |
| 2,307,187 | Anderson | Jan. 5, 1943 |
| 2,316,509 | Fawick | Apr. 13, 1943 |
| 2,517,521 | Zere | Aug. 1, 1950 |
| 2,747,386 | Ayling | May 29, 1956 |

FOREIGN PATENTS

| | | |
|---|---|---|
| 372,079 | Great Britain | May 5, 1932 |